Dec. 3, 1929.  S. D. PEALER  1,738,200
MITER BOX
Filed Oct. 13, 1926   2 Sheets-Sheet 1
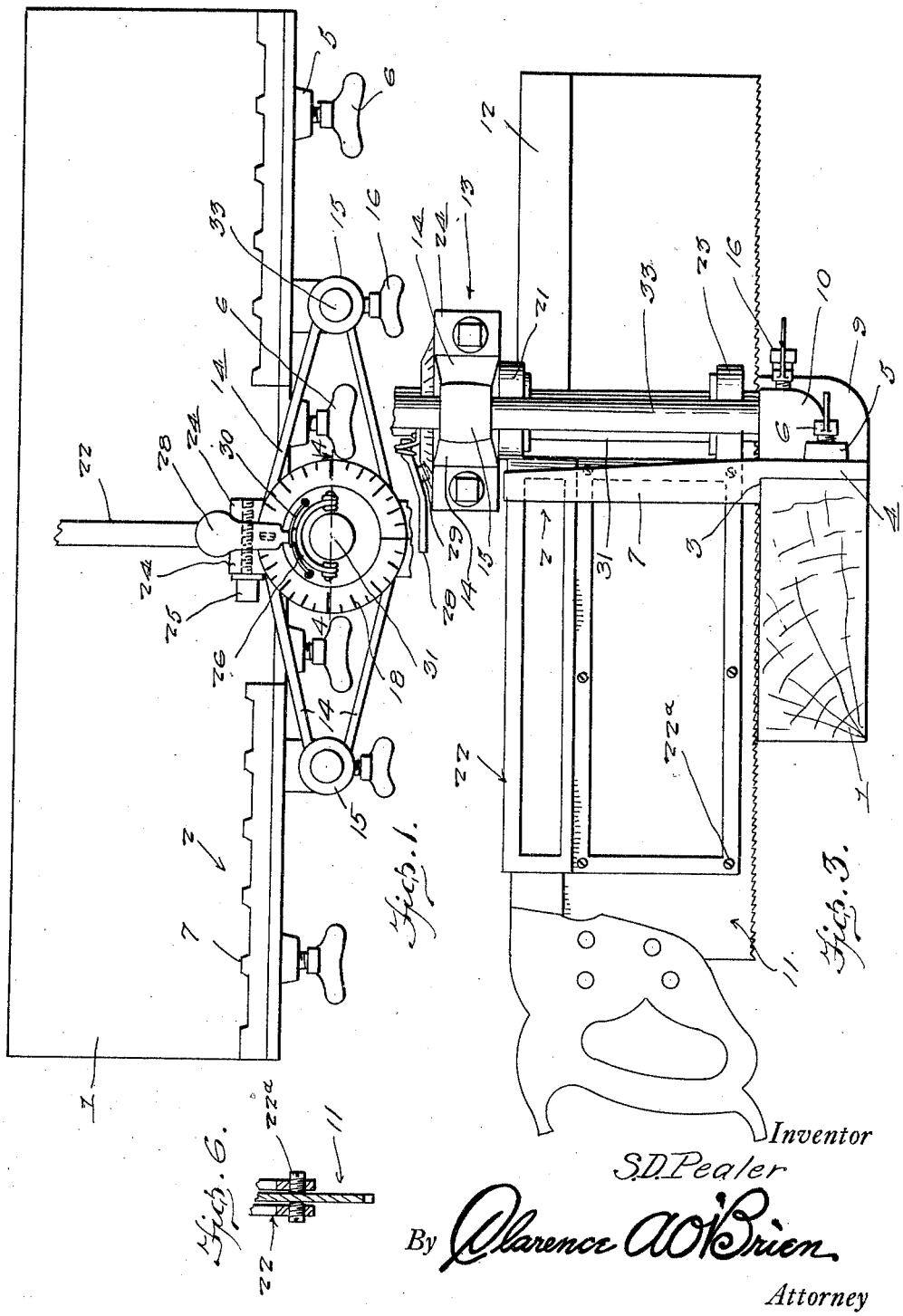
Inventor
S. D. Pealer
By Clarence A. O'Brien
Attorney

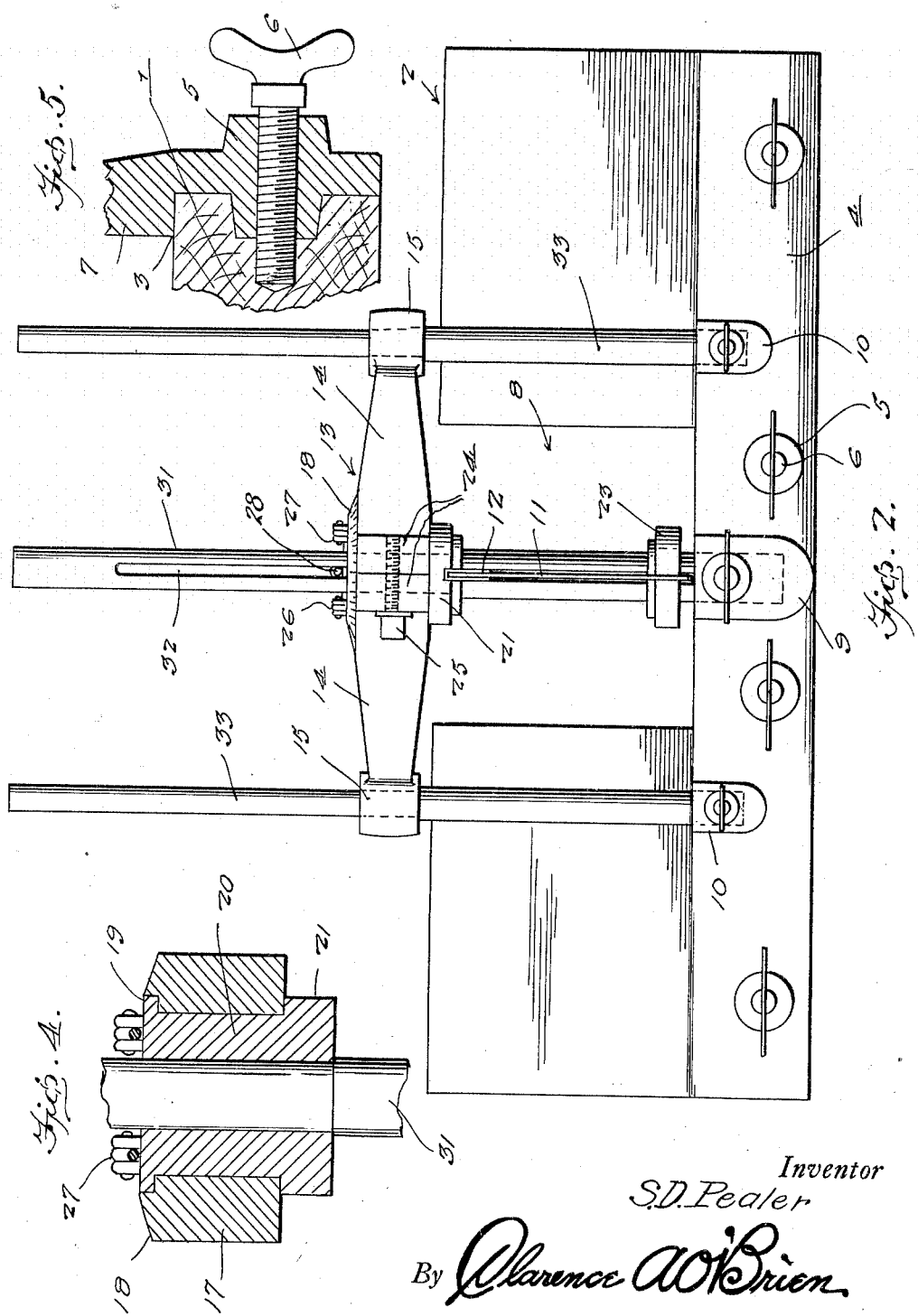

Patented Dec. 3, 1929

1,738,200

UNITED STATES PATENT OFFICE

SAMUEL D. PEALER, OF CHAGRIN FALLS, OHIO

MITER BOX

Application filed October 13, 1926. Serial No. 141,380.

This invention relates to an improved miter box which has been designed primarily for use by carpenters and wood-workingmen for accurate cutting of the work at hand.

Briefly, the invention has reference to a structure of this kind which embodies a base and an upstanding backing member for the work together with a novel adjustable saw-carrying and guide unit including accurate measuring and indicating means for permitting the blade to be disposed at the desired angle with respect to the base and back member to produce a desired angular cut of the work.

The structure has been designed for use with either a back or panel saw and the structure is such as to permit an angular cut of sixty degrees on each side of the transverse center of the base, thus allowing a combined measurement of 120° in order to permit minute adjustments of the saw for accurately cutting the work at an appropriate angle.

An equally important object is to provide a comparatively simple and inexpensive structure wherein all of the parts are associated in a novel manner and are detachably connected together so as to permit the entire structure to be knocked down and the parts arranged in a compact and convenient arrangement for carrying in a comparatively small tool box.

Other features and advantages of the invention will become apparent from the following description and drawings.

In the drawings:

Figure 1 is a top plan view of the complete device,

Fig. 2 is a rear elevation,

Fig. 3 is a central transverse section through the structure,

Figs. 4 and 5 are enlarged detail sectional views, and

Fig. 6 is also a detail view showing the manner in which the saw blade cooperates with a supporting and carrying frame.

Referring to the drawings in detail, it will be seen that the reference character 1 designates the base which is in the form of smooth timber of appropriate proportions. Rising from one longitudinal edge of this base is the backing member 2. This is preferably in the form of a metal plate having a shoulder 3 (see Fig. 3) at its bottom resting on the top of the base. That portion 4 which depends below the shoulder is provided with screw-threaded bosses 5 through which retaining screws 6 are threaded (see Fig. 5). Formed on that portion of the backing plate extending above the base are spaced parallel vertically extending ribs 7, the abutment surfaces of which are accurately finished. As shown in Fig. 2 a central opening 8 is formed in said backing plate to accommodate the saw blade. From this it will be seen that the backing plate will be readily attached to or removed from the base. Attention may be also called here to the fact that the small central portion of the backing plate is provided with a relatively large centrally disposed socket 9 and on opposite sides of this with smaller sockets 10.

The saw is generaly designated by the reference character 11 and it will be noted that the same is provided with a rigid back 12. A novel guiding and elevating unit generally designated by the reference character 13 is employed for supporting and guiding the saw. This unit comprises a special head which includes pairs of outwardly converging arms 14 terminating in guide eyes 15 carrying set screws 16. These arms are integrally connected at their inner ends with opposite sides of a collar 17 (see Fig. 4) and it will be noted that the upper side of this collar is beveled as at 18 and provided with graduations. In addition, the top of the collar is counter-bored to receive the flange 19 on the upper end of a rotary bushing 20. Formed integral with this bushing and more particularly the base portion 21 thereof is a special frame 22 constituting a mounting and carrier for the saw. As shown better in Fig. 6, adjusting screws 22ª are provided on the frame and bear against opposite faces of the blade of the saw thus permitting it to be held in a true vertical position. Connected to the lower bars of said frame and located in a vertical line beneath the outstanding base portion 21 of the aforesaid bushing 20 is a split collar 23. In this connection, I would state that the first-named collar 17 is made up of half-sections provided with outstanding ears 24 through which clamping bolts 25 extend. Moreover, a U-shaped bail 26 is pivotally mounted upon suitable brackets 27 on the upper end of the bushing 20. This bail carries a centrally disposed latch 28 having a detent 29 on its under side adapted to press upon the graduated periphery 18 of the colar 17. This is shown better in Figure 3. Here, I might state that if desired the graduations may be in the form of small notches for reception of the detent 29. This will insure positive maintenance of the latch. In addition, a suitable spring 30 is employed, connected to the bushing 20, and also to the latch 28 as shown in Figure 1 thus pressing the detent firmly down upon the collar. The detent also acts as an index or indication finger.

In order to swingably mount and maintain the unit just described in operative position I employ a central standard 31 having a vertically elongated slot 32 for reciprocatory movement of the blade of the saw. It is this standard which is surrounded by the bushing 20 and also the lower collar 23. Cooperating with the standard are upstanding guide posts 33 upon which the guide eyes 15 are slidably mounted. The posts 33 are detachably fitted in the aforesaid sockets 10 while the standard 31 is rotatably fitted in the central socket 9. The opening 8, of course, accommodates, the swinging movement necessary in the adjustment of the saw.

Assuming now that the structure is set up for use as shown in the drawing, it is obvious that the work is placed upon the top of the base 1 and forced firmly against the ribs 7. In this connection, these ribs act as a straight edge. If desired, suitable supplemental clamping means (not shown) may be employed for holding the work firmly in this place. Of course, when the work is thus placed in position, it is necessary to elevate the saw which is attached to the frame 22. This may be easily done inasmuch as the entire unit 13 may be slid upwardly upon standard 31 and the guide-posts 33. Then, the saw and unit is adjusted to produce the desired angular cut. In order to do this, the latch 28 is lifted against the tension of the springs 30. Then the relatively movable part of the unit comprising the frame 22 and the bushing 20 and the collar 23 and standard 31 may be swung and adjusted with respect to the stationary part 17 and arms 14. The detent 29 of the latch is now seated in the desired keeper seat on the graduated dial 18.

Before the frame can be swung to adjust the angular position of the saw, it is of course necessary to loosen the set screw in the socket 9 which releases the standard 31 at this time. This allows the standard, the frame, and the saw, as a unit to be swung to the desired adjusted position. Of course, after the adjustment is made, the set screw in the socket 9 is again tightened, to hold the standard at this place.

It is thought that by considering the description in connection with the drawings, a clear understanding of the construction and the operation of the invention will be had. In view of this, a more lengthy description is thought unnecessary.

While the preferred embodiment of the invention has been shown and described, it is to be understood that minor changes coming within the field of invention claimed may be resorted to if desired.

I claim:

In a miter box structure of the class described, a base, a work backing plate rising vertically from the base, said plate having an opening for swinging adjustment of a saw, a rotatably mounted slotted standard disposed in alinement with the opening in said backing plate, stationary guide posts mounted on opposite sides of the standard and at the ends of said opening, a graduated collar surrounding and slidable upon said standard, spider arms connected at their inner ends to said collar and extending outwardly therefrom and provided with guide eyes, said guide eyes being slidably mounted upon said posts, and a saw carrying frame rotatably mounted upon said collar and slidably mounted upon said standard and including an indicator cooperable with the graduations on said collar.

In testimony whereof I affix my signature.

SAMUEL D. PEALER.